US006349137B1

United States Patent
Hunt et al.

(10) Patent No.: US 6,349,137 B1
(45) Date of Patent: Feb. 19, 2002

(54) APPARATUS AND METHOD FOR PROVIDING SUPPORT SOFTWARE FOR AN AGENT WORKSTATION OF AN AUTOMATIC CALL DISTRIBUTOR

(75) Inventors: James Hunt, Falmouth, ME (US); Jared Blustein, Plymouth, NH (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/369,215

(22) Filed: Aug. 5, 1999

(51) Int. Cl.[7] .............................................. H04M 3/523
(52) U.S. Cl. .................. 379/265.06; 345/708; 345/710; 379/265.05; 714/38; 717/1
(58) Field of Search ................................. 345/336, 337, 345/338, 708, 709, 710; 379/265, 266, 309, 265.01, 265.02, 265.03, 265.04, 265.05, 265.06, 266.01; 714/37, 38, 39; 717/1, 11

(56) References Cited

U.S. PATENT DOCUMENTS

| | | | | |
|---|---|---|---|---|
| 5,500,941 A | * | 3/1996 | Gil | .............................. 714/38 |
| 5,638,494 A | * | 6/1997 | Pinard et al. | ................ 709/202 |
| 5,642,410 A | * | 6/1997 | Walsh et al. | ................. 379/201 |
| 5,757,904 A | * | 5/1998 | Anderson | .................... 379/265 |
| 5,761,288 A | * | 6/1998 | Pinard et al. | ........... 379/265 X |
| 5,890,152 A | * | 3/1999 | Rapaport et al. | .............. 707/6 |
| 5,960,198 A | * | 9/1999 | Roediger et al. | .............. 717/4 |
| 6,164,841 A | * | 12/2000 | Mattson, Jr. et al. | ........... 716/1 |
| 6,202,205 B1 | * | 3/2001 | Saboff et al. | ................... 717/9 |
| 6,219,805 B1 | * | 4/2001 | Jones et al. | .................... 714/38 |

* cited by examiner

Primary Examiner—Harry S. Hong
(74) Attorney, Agent, or Firm—Welsh & Katz, Ltd.

(57) ABSTRACT

An agent of an automatic call distribution system which requires a plurality of software applications employs a server which profiles a software applications usage pattern and preloads a set of software applications based upon the profile of most commonly used applications. One or more computer servers sends one or more requesting computers a most likely predicted-to-be selected software application by forming an association from the software usage profile between a first application and a second application.

32 Claims, 3 Drawing Sheets

APPARATUS AND METHOD FOR PROVIDING SUPPORT SOFTWARE FOR AN AGENT WORKSTATION OF AN AUTOMATIC CALL DISTRIBUTOR

FIELD OF THE INVENTION

This invention relates to automatic call distributors and, more particularly, to distributors with agent workstations using software applications.

BACKGROUND OF THE INVENTION

Automatic call distribution systems are known. Such systems are typically used as a means of distributing telephone calls among a group of agents of an organization. As calls are directed to the organization from the public switch telephone network (PSTN), the automatic call distribution system directs the calls to its agents based upon some algorithm. For example, the automatic call distributor (ACD) may recognize a call target based upon an identity of an incoming trunk line and route the call accordingly.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. The ACD may transfer an identifier of the customer to the database based upon an automatic number identification (ANI) facility, operating from within the PSTN. The host, in turn, displays the customer records via a computer terminal of the selected agent at the time the call is delivered. Then, as the call progresses, the computer terminal of the agent is updated by a number of software applications needed to service the customer. Updating the computer terminal of the agent requires that the software applications be retrieved from a database. The computer program running on the agent's workstation queries the database for the required software application. For example, an agent may be processing a customer's order and may be accessing a purchase order software application. Then, to finish processing the order, a shipping order form may be needed. In such a situation, the agent and customer will have to wait for the agent's workstation to query the database for the necessary software application.

While the existing method of providing software support for an agent workstation of an ACD is relatively satisfactory, it requires the agent to wait until software applications are retrieved from the database having the customer wait while the agent workstation is loaded with the proper applications. Waiting for software applications to be retrieved from the database may cause the agent, and thereby the customer, to have to wait for a very long time. As a consequence, the customer may become frustrated and irritated with the service. Accordingly, a need exists for a better method of providing software support for an agent workstation of an ACD.

It is therefore an object of the present invention to reduce the disadvantage of having to wait for software applications to be retrieved in automatic call distributors by providing a system and method of providing software support for an agent workstation of an automatic call distributor. By loading software applications in the agent workstation before an agent requires the software application, time spent waiting for the retrieval from the database is reduced.

This objective is achieved through provision of an automatic call distributor having a computer server interface to a database. Such system comprising: (a) at least one processor which creates a usage profile of software applications based upon call associated information received from an automatic call distributor and (b) at least one processor which preloads a set of software applications based upon the usage profile of software applications. Further, the server interfaces to a number of agent workstations and functions as a source of software applications.

An object of the present invention is also achieved by providing a software support method whereby the computer profiles software applications usage pattern based upon call associated information received from an automatic call distributor and preloads a set of software applications based upon the profile of most commonly used applications. The method includes the step of monitoring software usage by the agent workstation of a plurality of software applications available to the agent workstation to form a software usage profile so that subsequent software applications may be loaded based upon the association of the current activity of the call center to the statistics in the software usage profile. The software usage profile is searched to determine which software application to load based upon the current activity of the call center.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
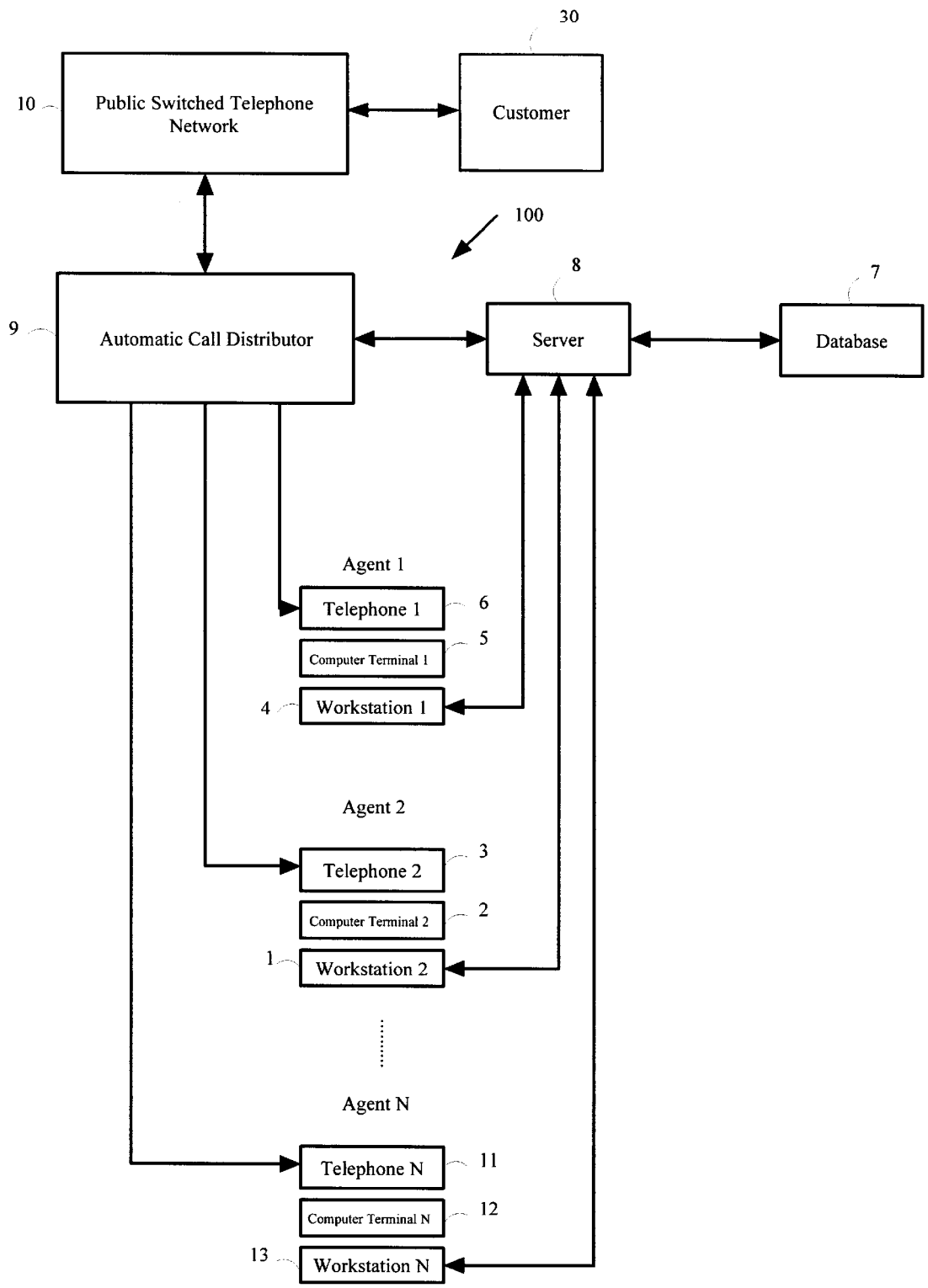
FIG. 1 is a simplified functional block diagram of an example of an automatic call distribution system in accordance with an illustrated embodiment of the invention.

Referring now to FIG. 1, there is shown an example of the system and method of the present invention as it may be employed and incorporated into an automatic call distribution system 100. The illustrated example functions to selectively and automatically interconnect a caller 30 calling through the public switched telephone network 10 to one of a number of agent telephones 1–N (3, 6, 11) where N may be any preselected number greater than one. For a more detailed discussion of automatic call distributors, reference may be made to U.S. Pat. No. 5,268,903 to Jones et al. entitled "Multichannel Telephonic Switching Network With Different Signaling Formats and Connect/PBX Treatment Selectable For Each Channel", issued Dec. 7, 1993; U.S. Pat. No. 5,140,611 to Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 to Lenihan et al. entitled "Tone and Announcement Message Code Generator for a Telephonic Switching System and Method", issued Jun. 30, 1992.

In addition to the agent telephones 3, 6, 11, the automatic call distributor 9 also interfaces with a computer server 8. The server 8 functions to provide agent workstations 1–N (1, 4, 13) (where N is a preselected number) with information from the ACD 9 and a database 7. For example, as calls are received from the PSTN 10, call associated information (e.g., ANI, DNIS, etc.) may be delivered to the workstation 1, 4, 13 along with the call. Where ANI information is delivered along with the call, the workstation 1, 4, 13 may use the ANI information as a file identifier to retrieve customer information from a database 7.

The server 8 may provide information from the database 7 on a number of different levels. Not only may the server 8 function to deliver customer files to a workstation 1, 4, 13, but it may also function to provide software applications and forms upon request by the workstation 1, 4, 13. Under the illustrated embodiment, the server may also maintain a state engine regarding each agent workstation 1, 4, 13 where information about the contents of agent workstation caches 24, 28, 29 (within the workstations 24, 28, 29) may be stored.

As mentioned, the database functions to store a number of software applications that the agent workstations 1, 4, 13 require. The database may also store performance statistics, customer information, and dial lists of the ACD 9 system. Dial lists may be lists of telephone numbers of actual or potential customers. The statistics within the database may include profiling information of the agent workstations.

As used herein, profiling information shall be defined to mean an ordered collection of software identifiers associated with each particular call type. For instance, call type may be determined by call associated information delivered along with a call or by information obtained from the caller. The software identifiers may be used to define the collection of software applications that are typically needed to service each particular type of call.

Under the illustrated embodiment, a call may be delivered to a workstation and serviced under any of a number of different formats. For example, a caller may dial a particular department (e.g., service) of an organization. The call may be delivered by the PSTN 10 along with the call associated information. From the call associated information, the ACD 9 may determine that the call is of a first call type.

Upon determining that the call is of a first type, the ACD 9 may identify a qualified agent (e.g. agent 1). In order to service the call, the workstation 4 may, for example, request an initial software application (e.g., application a) to begin servicing the call. The initial application may present text to the agent which is to be read to the caller (e.g., "Hello, thank you for calling XYZ service department. Please state whether your inquiry is for product A or product B."). Based upon the caller's answer, the workstation 4 may request a second application (e.g., application b) to service product A or a third application (e.g., application c) to service product B.

At some point the caller may wish to place an order. In order to complete the order, the agent may need to call up an application (e.g., application d) which provides an order form.

In an alternative, a call may have been placed by the ACD 9 from a customer list using an predictive outdialing routine. Since it is an outdialed call, the ACD 9 may classify the call as being of a second type.

When the second type call is answered by a customer 30, the ACD may assign the call to an agent (e.g., agent 2). In order to service the outdialed call, the workstation 1 may require an entirely different set of software applications. In one exemplary embodiment, the first application (e.g., application e) may be text providing the agent with a "sales pitch" to be presented to the called party. Later applications (e.g., applications e, f, g) may provide specific product information and/or an order form.

Because of the number and complexity of the software applications that may be desirable in a given system, the workstations 1, 4, 13 in one embodiment can optionally be arranged to be able to store only a limited number of relevant applications at any one time in the workstation caches 24, 28, 29. As a consequence, applications may typically be copied on an as-needed basis.

In order to facilitate the availability of the applications, the order and identity of the software applications requested by the agent (both order and identity) may be collected over time by the server 8 and used to create a software profile for each call type. Controls may be built into screens presented to the agent based upon the software profile. As an example, controls may simply be graphical devices such as softkeys, scroll bars, radio buttons, or pull-down menus.

Based upon the software profile for each call type, the server 8 or another processor (not shown) may begin anticipating software requests. Upon determining a call type, the server 8, in one exemplary embodiment, may present a list of applications predicted for the call type (e.g., as softkeys on a screen of the workstation 1, 4, 13) and query the agent workstation to determine whether those applications are in cache. In another embodiment, the server 8 may automatically download applications in the proper sequence and the agent may simply activate an ENTER button to proceed from one application to the next.

Figure 2:
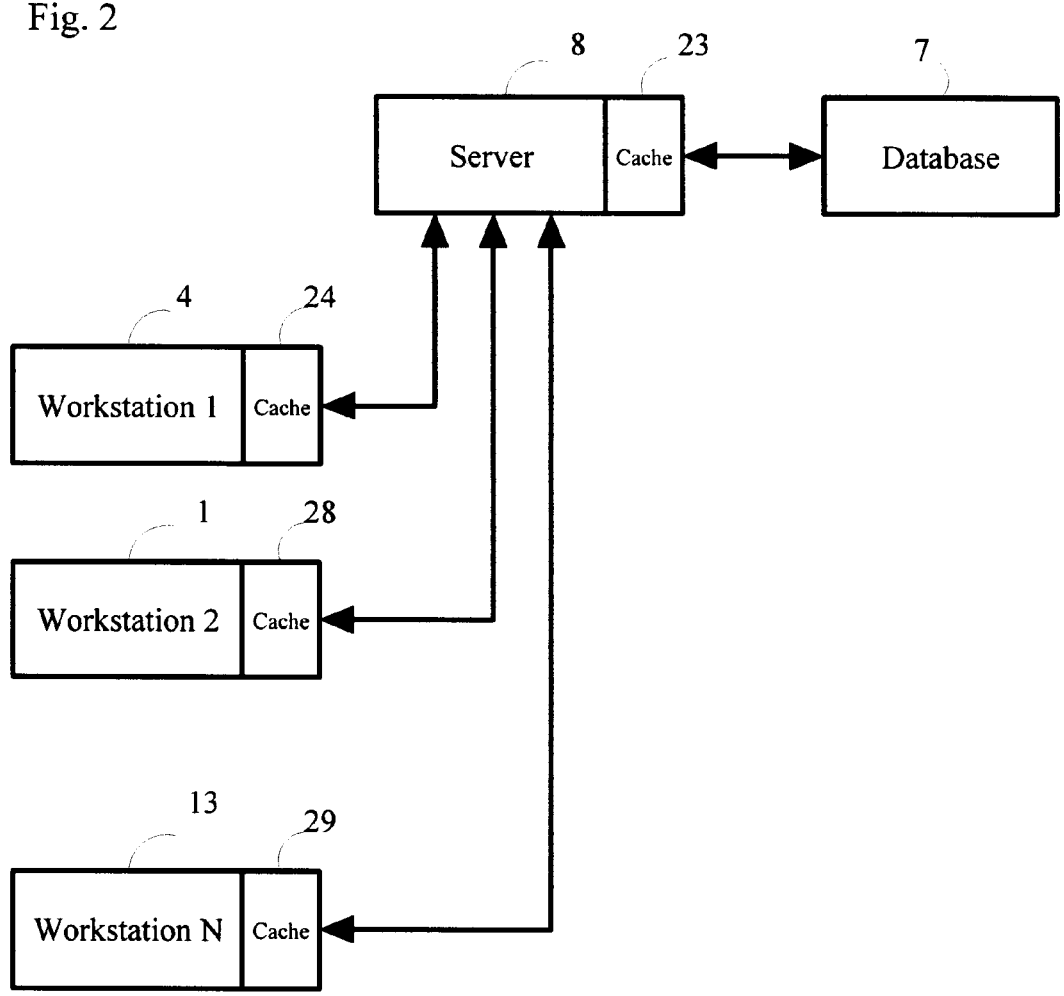
FIG. 2 is a simplified functional block diagram of a specific embodiment of the software support system of FIG. 1.

Referring now to FIG. 2, the server 8 may also include a cache 23. The cache 23 of the server 8 may support agent workstations (e.g. 1, 4, 13) by functioning as a source of software applications. Accordingly, the cache 23 interfaces with the database 8 to store retrieved software applications before copies are sent to the agent workstations 1, 4, 13.

In addition, the agent workstations 1, 4, 13 may include caches 1–N (e.g. 24, 28, 29), where N is a preselected number. The cache memory 24, 28, 29 in agent workstations 1, 4, 13 may be used to store copies of software applications. As an agent workstation requests an application, if the appropriate application is already in cache 23, then it is copied to the requesting agent workstation's cache 24, 28 or 29. If the application is not in cache 23, then it may be retrieved from the database 8 and copied to the server's cache 23 before copying to the requesting agent workstation's cache 24, 28 or 29.

Figure 3:
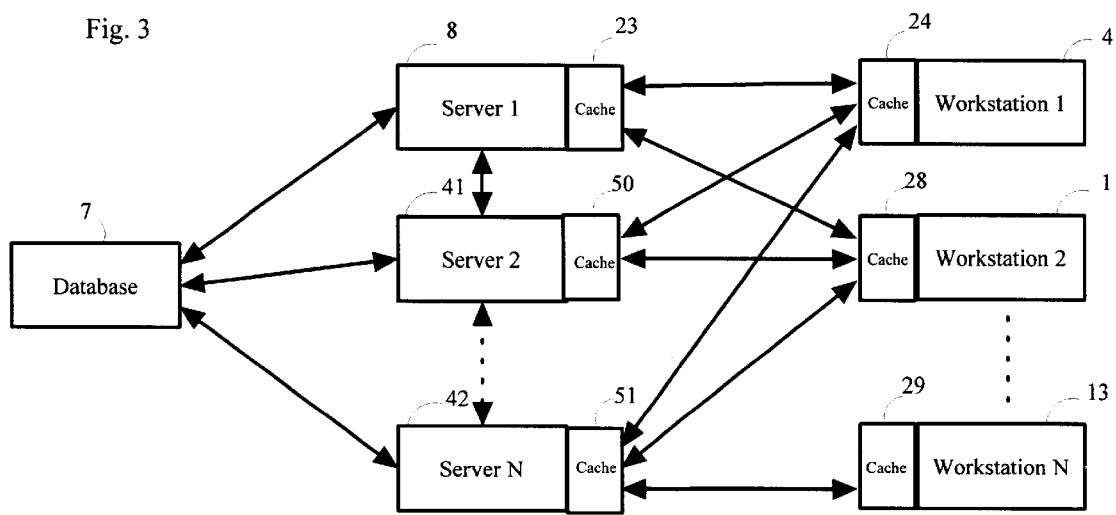
FIG. 3 is a simplified functional block diagram of an exemplary embodiment of a multiserver software support system of FIG. 1.

Referring now to FIG. 3, there is illustrated an example of an embodiment where there is a number of servers 1–N (8, 41, 42) (where N is a preselected number) associated with ACD 9 of FIG. 1. In the illustrated embodiment of FIG. 3, any of the number of servers 1–N (8, 41, 42) may interface with any of the number of agent workstations 1, 4, 13 through a local area network (LAN). In such a case, the servers 8, 41, 42 may maintain knowledge (e.g., lists) of each other's caches 23, 50, 51 to provide for automatic load balancing by automatically moving agent workstations from heavily loaded servers to a server with a smaller load. For example, if agent workstation 1 (4) interfaces with a heavily used server then it may automatically be moved to a less heavily used server.

In accordance with one embodiment of the present invention, a method of providing software support is provided comprising the steps of: (a) profiling a software applications usage pattern based on call associated information received from an automatic call distributor, and (b) preloading a set of software applications based upon the profile of most commonly used applications.

The step of profiling functions to provide a prediction of required software applications before agent workstations request them. The server 8 (e.g., using a profiling application) profiles a software applications usage pattern and the database 7 stores collected profiled usage statistics generated by the server 8.

As an application session begins, the previously stored usage pattern is loaded from the database 7 into the server. The profiling application generates a sequence of references, illustrated here as references to software applications a b c d e. The server 8 looks to the cache 23 for the software applications resident in it. In this example, software applications a b and e may initially reside in cache 23. Thus, requests for applications a and b from a workstation results in the return to the agent workstation of copies of these software applications. Since the next accessed software application (i.e., c) is not in the cache 23, the server 8 locates the software application in the database 7 and copies the software application to the requesting agent workstation.

As agent workstations make requests to the server, the profiler monitors the current access sequence. When it recognizes a repeating access sequence from the usage pattern, it generates a prediction. In this case, for example, from the sequence a b c the profiler may predict a completion of the pattern d e f g. Since e is already in the cache 23, the server preloads the remaining predicted items d f and g by sending copies of those software applications to the appropriate agent workstation. For example, when an agent workstation receives a call from the ACD 9, the server recognizes the current access pattern from pattern memory (and call type) and preloads the agent workstation with call setup and call initialization software applications.

At the end of an application session, usage statistics may be copied to the database 8 for use at a future date. Further, usage statistics may be useful for developing agent performance statistics or agent usage algorithms, such as for predictive outdialing.

The step of preloading functions to provide agent workstations 1, 4, 13 with copies of software applications before the workstations have requested the applications.

When an agent workstation makes a request to the server for a software application, the server queries the database for the particular information. When the server retrieves the particular information, it is copied to the cache 23 on the server 8. The transfer of the requested software application from the database to the server to the workstation, happens automatically and transparent to the agent workstation requesting the software application.

Since caches are kept full, the step of preloading requires certain, less used software applications residing in the cache to be replaced by more frequently used software applications. The caches 23, 24, 28, 29 employ a least recently used replacement algorithm to effectuate replacement. Any new data evicts data that was used least recently. Specifically, when a new application is added, the least recently used application is discarded. In an embodiment of the present invention, a technique called "hinting" may be employed. By assigning weights to software applications in the cache, this software support method influences which software applications to replace. Each software application in the cache is assigned a weight ranging from zero to 32,767. The cache may replace applications based upon the time in the cache and based upon the weight given to any application. For example, if an older application with a higher weight and a new application are both in the cache when another application is waiting to be added, the new application will be replaced whereas the older one will not be replaced since it has a higher weight. Further, the caches 23, 24, 28, 29 may employ usage statistics to preload software applications. When a software application is retrieved from the database 7, a most likely to be used software application is also retrieved for a software application that is likely to be needed in the future. Based upon statistical usage predictions, the server makes a prediction about future software application requirements. For example, an agent workstation requesting a purchase order software application will most likely also need a shipping order application. Where the server 8 recognizes such a relationship, a request for the purchase order software application also results in the downloading of the shipping order application, as the shipping order software application is likely to be needed in the future.

Further, the caches 23, 24, 28, 29 may employ learning as a method of increasing the performance of applications that retrieve data. The server 8 recognizes and learns access pattern regularities that appear over time and may instruct the agent workstations 1, 4, 13 to refresh certain software applications in the agent workstation caches 24, 28, 29. For example, a sales promotion may result in a large number of calls having very similar software requirements. Exploiting regularities to anticipate movement of software applications across the database 7 and server 8 boundary adds to the performance of the system by reducing delay times. The ability to predict the approximate immediate future in detail may allow the software support system to be more efficient and reduce the time an application waits for data having to be loaded from the database.

Further, the caches 23, 24, 28, 29 may employ learning, in another context, as a method of increasing call performance. As software applications are updated with new controls, the new changes are updated in the caches 24, 28, 29 so that when the software application is required in the future, it will have the updated controls. In a continuation of the previous example, the sales promotion may result in a large number of calls from Midwest cities and agents handling the calls may frequently access a pull-down menu of Midwest cities. Initial accesses to the shipping order form may not contain the appropriate pull-down menu, but subsequent accesses to the shipping order form will contain the pull-down menu, as the shipping order form will be updated in the cache to contain the pull-down menu. By updating forms in caches 24, 28, 29, the cache learns about the needs of the agent workstation and adapts to meet the needs of the agent workstation.

In one embodiment of the software support system and method, software applications comprise pseudo-code representation of automatic distributor system forms and controls for forms. As with applications, the pseudo-code may be preloaded in anticipation of use.

A specific embodiment of a method and apparatus of software support according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A system for providing software support for an agent workstation of an automatic call distributor, such system comprising:

at least one processor which creates a usage profile of software applications based upon call associated information received from the automatic call distributor; and at least one processor which preloads a set of software applications based upon the usage profile of software applications.

2. The system for providing software support as in claim 1 wherein at least one processor which profiles also further preloads at least one software application based upon the usage profile.

3. The system for providing software support as in claim 1 wherein the at least one processor which creates a usage profile is also the at least one processor which preloads.

4. The system for providing software support as in claim 1 wherein the at least one processor which profiles further comprises a comparative processor which forms an association between a first application used during a first time period and a second application used during a subsequent time period.

5. The system for providing software support as in claim 1 wherein the at least one processor which profiles further comprises a processor which replaces a set of software applications based upon the needs of the agent workstation.

6. The system-for providing software support as in claim 1 wherein the at least one processor which profiles further comprises a server which loads a set of software applications based upon the needs of the agent workstation.

7. The system for providing software support as in claim 1 where at least one processor which profiles and at least one processor which preloads further comprises a plurality of servers.

8. A system for providing support software for an agent workstation of an automatic call distributor, such system comprising:

means for profiling a software application's usage pattern of the agent workstation based upon call associated information received from an automatic call distributor;

means for preloading a set of software applications to the agent workstation based upon the profile of most commonly used applications, means for forming an association between a first application of the plurality of software applications used during a first time period and a second application of the plurality of software applications used during a subsequent time period;

means for loading the first software applications into a cache memory of the agent workstation based upon the software usage profile; and means for loading the second software application of the plurality of software applications into the cache memory based upon the formed association between the first and second applications.

9. The system for providing software support as in claim 8 further comprising means for storing the software application's usage pattern.

10. The system for providing software support as in claim 8 comprising means for storing the software applications.

11. The system for providing software support as in claim 8 comprising means for replacing some of the preloaded software applications based upon subsequent profiling activity.

12. The system for providing software support as in claim 8 comprising means for selecting a software application based upon a usage factor.

13. The system for providing software support as in claim 8 comprising means for storing the software applications in the agent workstation.

14. The system for providing software support as in claim 13 further comprising caching means for storing the software applications in the agent workstation.

15. The system for providing software support as in claim 8 comprising means for storing the software applications in the server.

16. The system for providing software support as in claim 15 further comprising caching means for storing the software applications in the server.

17. A method of providing software support for an agent workstation of an automatic call distributor, such method comprising the steps of:

profiling software applications usage by the agent workstation of a plurality of software applications to create a software usage profile;

preloading a set of software applications based upon the software usage profile.

18. The method of providing software support as in claim 17 further comprising storing the software usage profile in the computer server and in a database.

19. The method providing software support as in claim 17 further comprising replacing some of the preloaded software applications based upon subsequent profiling activity.

20. A method for providing support software for an agent workstation of an automatic call distributor, such method comprising the steps of:

profiling software application usage by the agent workstation of a plurality of software applications;

preloading a set of software applications into a cache memory of the agent workstation based upon the software usage profile;

forming an association between a first application of the plurality of software applications used during a first time period and a second application of the plurality of software applications used during a subsequent time period;

changing cache memory configuration of the agent based upon the formed association between the first and second applications; and maintaining cache consistency between the cache memory of the agent workstation and the cache memory of the computer server.

21. The method of providing software support as in claim 20 further comprising storing the software usage profile in the computer server and in a database.

22. The method of providing software support as in claim 20 further comprising replacing some of the preloaded software applications based upon subsequent profiling activity.

23. The method of providing software support as in claim 20 further comprising selecting a software application for replacement based upon a usage factor.

24. The method of providing software support as in claim 23 wherein the usage factor further comprises multiplying a number of usage over a time period by a weighting factor.

25. The method of providing software support as in claim 20 wherein the step of changing the cache memory configuration further comprises adding controls to the preloaded applications based upon agent workstation usage.

26. The method of providing software support as in claim 25 wherein the step of adding controls further comprises graphical displays.

27. The method of providing software support as in claim 20 wherein the step of changing the cache memory configuration further comprises adding software applications into a cache memory of the agent workstation based upon subsequent profiling activity.

28. The method of providing software support as in claim 20 further comprising adding software applications to a cache memory of the agent workstation based upon similarity to the preloaded applications.

29. The method of providing software support as in claim 28 wherein the step of adding software applications, based upon similarity further comprises comparing formatting information.

30. The method of providing software support as in claim 20 wherein the step of preloading further comprises using call associated information from the automatic call distributor to load software applications into a cache memory of the agent workstation.

31. The method of providing software support as in claim 20 wherein the step of maintaining further comprises querying the cache memory of the agent workstation for changes.

32. The method of providing software support as in claim 20 wherein the step of maintaining further comprises informing the cache memory of the computer server of changes to the cache memory of the agent workstation.

* * * * *